United States Patent
Chu et al.

(10) Patent No.: US 10,534,456 B2
(45) Date of Patent: Jan. 14, 2020

(54) TOUCH SCREEN LIGHT ABSORPTION LAYER

(71) Applicant: HEWLETT-PACKARD DEVELOPMENT COMPANY, L.P., Houston, TX (US)

(72) Inventors: Wei Kuang Chu, Taipei (TW); Kuan-Ting Wu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/563,270

(22) PCT Filed: Jul. 31, 2015

(86) PCT No.: PCT/US2015/043252
§ 371 (c)(1),
(2) Date: Sep. 29, 2017

(87) PCT Pub. No.: WO2017/023274
PCT Pub. Date: Feb. 9, 2017

(65) Prior Publication Data
US 2018/0136749 A1    May 17, 2018

(51) Int. Cl.
*G06F 3/041* (2006.01)
*G02B 5/20* (2006.01)
*G02F 1/1335* (2006.01)

(52) U.S. Cl.
CPC .......... *G06F 3/041* (2013.01); *G02B 5/208* (2013.01); *G02F 1/133509* (2013.01); *G02F 1/133512* (2013.01); *G02F 2202/28* (2013.01)

(58) Field of Classification Search
CPC ....... G06F 3/041; G02B 5/208; H01L 33/502; H01L 33/504; H01L 33/50; H01L 33/507; H01L 25/0753
See application file for complete search history.

(56) References Cited

U.S. PATENT DOCUMENTS

| | | |
|---|---|---|
| 8,658,049 B2 | 2/2014 | Yen |
| 2008/0030633 A1 | 2/2008 | Tsai et al. |
| 2009/0213096 A1 | 8/2009 | Kuo |
| 2011/0083765 A1* | 4/2011 | Stark ............... F16L 55/162 138/97 |
| 2012/0169639 A1 | 7/2012 | Tu et al. |
| 2013/0126029 A1* | 5/2013 | Hummel ........... F16L 55/1656 138/97 |

(Continued)

FOREIGN PATENT DOCUMENTS

| | | |
|---|---|---|
| CN | 204143409 U | 2/2005 |
| CN | 103646958 A | 3/2014 |

(Continued)

OTHER PUBLICATIONS

"UV Blocking Tempered Glass," Reference, May 2015, pp. 1-82, Asahi Glass Co., Ltd., AGC Group.

*Primary Examiner* — Xuemei Zheng
(74) *Attorney, Agent, or Firm* — HPI Patent Department

(57) ABSTRACT

Example implementations relate to a touch screen light absorption layer. For example, a display device may include a touch screen sensor to receive a touch input, a display panel to display content based on the touch input, and a light absorption layer adjacent to the touch screen sensor. The light absorption layer may absorb blue light.

15 Claims, 3 Drawing Sheets

(56) References Cited

U.S. PATENT DOCUMENTS

| | | | | |
|---|---|---|---|---|
| 2014/0016043 A1* | 1/2014 | Chen | ............... | G06F 3/041 349/12 |
| 2014/0071417 A1 | 3/2014 | Grespan et al. | | |
| 2015/0004382 A1 | 1/2015 | Menon et al. | | |
| 2016/0320621 A1* | 11/2016 | Biteau | ............... | G02B 5/22 |
| 2018/0194099 A1* | 7/2018 | Wilcoxen | ............ | B31F 1/2895 |

FOREIGN PATENT DOCUMENTS

| | | | |
|---|---|---|---|
| CN | 103935097 A | | 7/2014 |
| CN | 104403612 A | | 7/2014 |
| CN | 204102106 | | 1/2015 |
| CN | 204143408 U | | 2/2015 |
| CN | 204143410 U | | 2/2015 |
| CN | 104388018 A | | 3/2015 |
| CN | 104441867 A | * | 3/2015 |
| CN | 104449422 A | * | 3/2015 |
| CN | 104497902 | | 4/2015 |
| CN | 104576933 | | 4/2015 |
| CN | 204265674 U | | 4/2015 |
| CN | 104388018 B | * | 6/2016 |
| JP | 2014219647 A | | 11/2014 |
| JP | 2014219647 A | * | 11/2014 |

* cited by examiner

TOUCH SCREEN LIGHT ABSORPTION LAYER

BACKGROUND

Touch screen computing devices allow a user to provide an input to the computing device by touching various parts of the touch screen. For example, a user may use their finger and/or a stylus pen to provide touch inputs on the screen in order to manipulate the content on the screen.

BRIEF DESCRIPTION OF THE DRAWINGS

Some examples of the present application are described with respect to the following figures.

DETAILED DESCRIPTION

As described above, touch screen computing devices allow a user to provide an input to the computing device by touching various parts of the screen. Touch screens have become prevalent among various computing devices, such as smartphones, tablets, laptops, and other various display computing devices. However, prolonged use of these display devices may cause health issues for a user, such as discomfort to the user's eyes, eye damage and/or disease, premature aging of the eye, and the like.

Examples discussed herein provide techniques for reducing chronic damage to the eye by providing a light absorption layer to touch screen display devices. The light absorption layer may absorb blue light and/or ultraviolet (UV) light to reduce radiation and glare generated by the display device and to provide protection to parts of the user's eyes, such as the macula of the eye.

Figure 1:
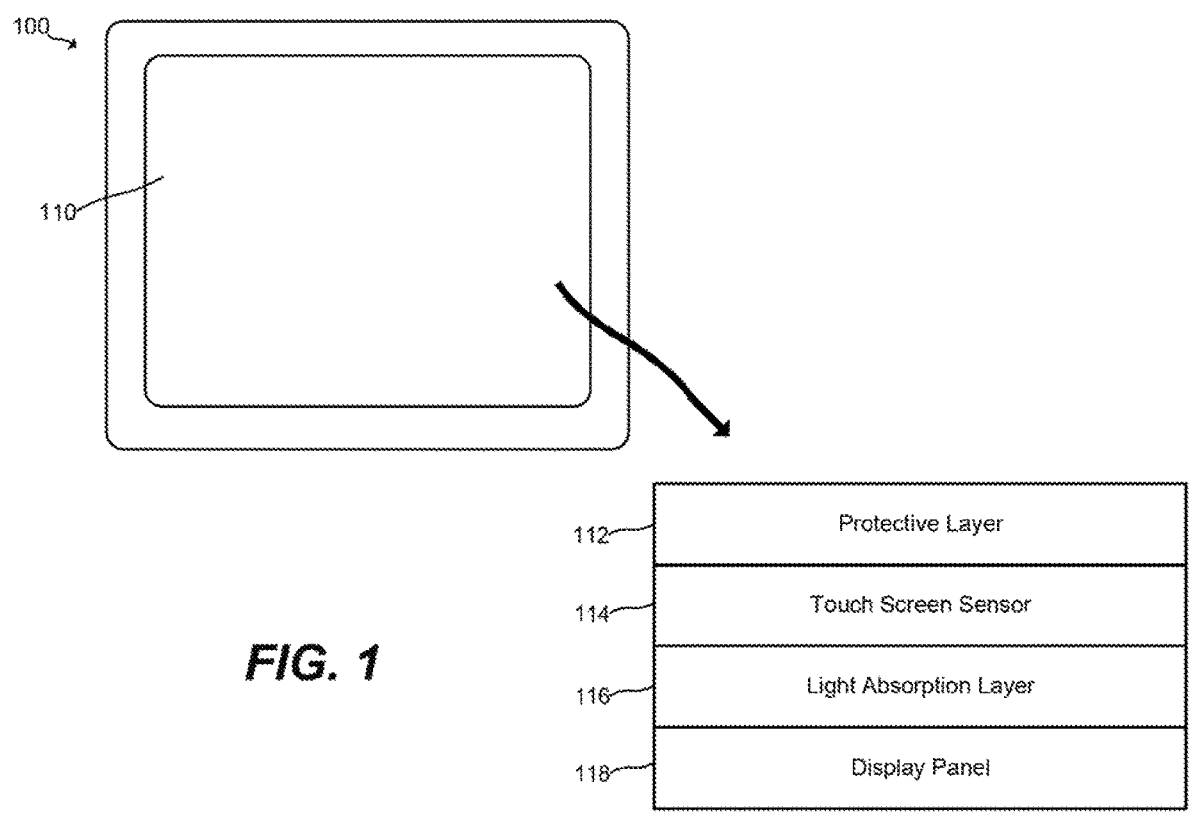
FIG. 1 is a block diagram of a touch screen display device with a light absorption layer.

Referring now to the figures, FIG. 1 is a block diagram of a touch screen display device 100 with a light absorption layer 116. The display device 100 may be any suitable computing device having a display, such as a notebook computer, a desktop monitor, a tablet computing device, a mobile phone, an electronic book reader, a display on a printing device, or any other suitable electronic display device have touch screen capabilities. The display device 100 may include a display component 110 to display various content on the display device 100.

The display component 110 may include a protective layer 112, a touch screen sensor 114, a light absorption layer 116, and a display panel 118. The protective layer 112 may be an optional layer to the display component 110 and may be any suitable layer providing protection to the display component 110. For example, the protective layer 112 may be a cover lens or a hard coating that may be adjacent (e.g., next to, touching, etc.) to the touch screen sensor 114 and may provide protection from external elements that may damage or scratch the touch screen sensor 114, the light absorption layer 116, and/or the display panel 118.

The touch screen sensor 114 may be any suitable sensor to detect and/or process touch inputs. For example, the touch screen sensor 114 may receive a touch input (e.g., from a user).

The display panel 118 may be any suitable electronic component(s) to display content. For example, the display panel 118 may display content based on a touch input received by the touch screen sensor 114. The display panel 118 may be any suitable type of display panel, such as a liquid crystal display (LCD), an organic light emitting diode (OLED) display, a polymer light emitting diode (PLED) display, a plasma display, bi-stable display (e.g., a cholesteric display), and the like.

The light absorption layer 116 may be any suitable layer to absorb light. The light absorption layer 116 may be adjacent to the touch screen sensor 114. For example, the light absorption layer 116 may be located between the touch screen sensor 114 and the display panel 118. The light absorption layer 116 may be directly bonded to the touch screen sensor 114 and/or the display panel 118. In some examples, the thickness of the direct bonding may be less than 0.3 millimeters.

The light absorption layer 116 may include a layer to absorb blue light, such as a blue light absorption optical clear adhesive (OCA) and/or a blue light absorption optical clear resin (OCR). Any suitable resins of blue light absorption OCAs and/or OCRs may be used, such as a polyacrylic (e.g., poly(methyl methacrylate) (PMMA)), polycarbonate, cyclic olefin copolymer (COC), polyethylene terephthalate (PET), and the like.

In some examples, the degree of blue light absorption and/or reduction on the display device 100 may be based on an amount of transparent or semi-transparent yellow color additives included in the light absorption layer 116. Examples of yellow color additives may include iron oxide, $NiTiO_3$, lutein, lead sulfochromate yellow, lead antimonite yellow, lead-tin-antimony yellow, diarylide, arylide, bisacetoacetarylide, benzimidazolone, and the like.

In some examples, the light absorption layer 116 may also include an UV absorption layer to further absorb light. Any suitable UV absorption layer may be used, such as benzophenones, anthranilates, dibenzoylmethanes, para-aminobenzoic acid (PABA) derivatives, salicylates, cinnamates, camphor derivatives (e.g., 290-400 nanometers), and the like.

Figure 2:
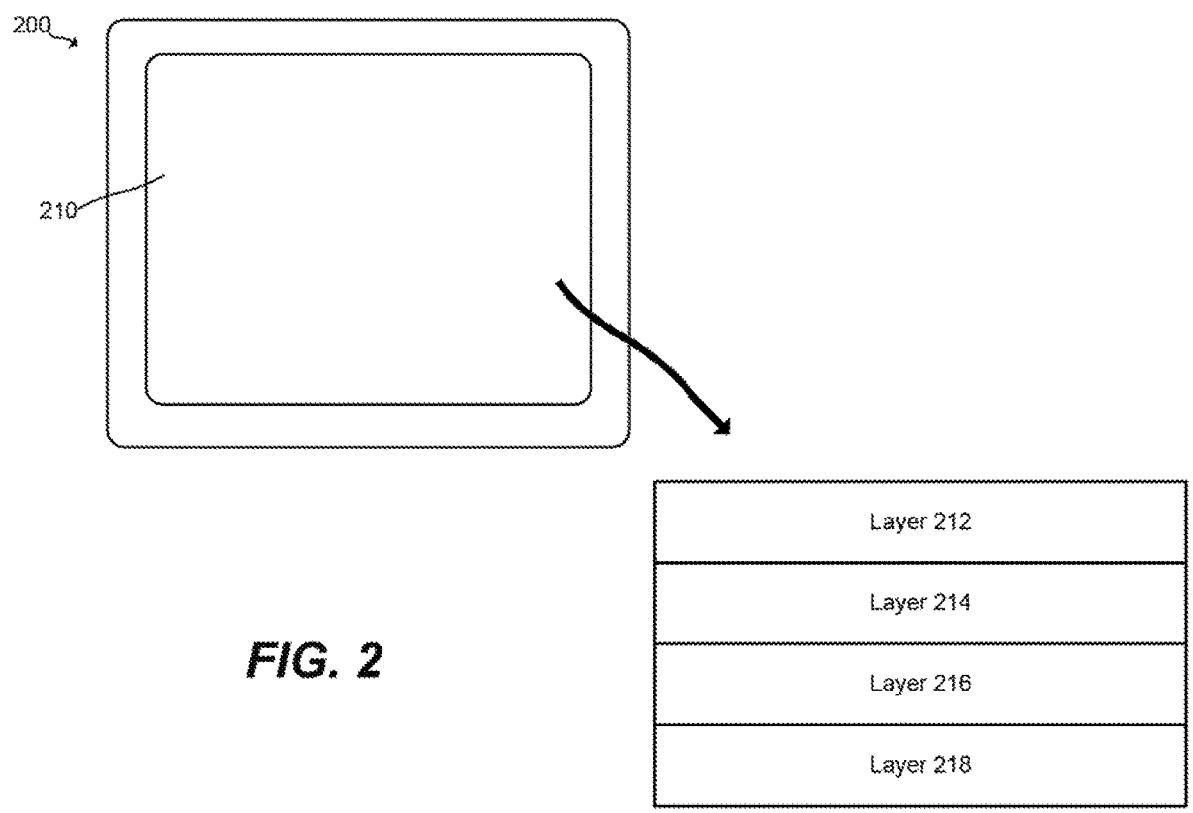
FIG. 2 is a block diagram of a touch screen display device with a light absorption layer.

FIG. 2 is a block diagram of a touch screen display device 200 with a light absorption layer. The display device 200 may be similar to the display device 100 of FIG. 1 and may include a display component 210, which may be similar to the display component 110 of FIG. 1.

The display component 210 may include layer 212, layer 214, layer 216, and layer 218. Layer 212 may be adjacent to layer 214 and may include a cover lens or a hard coating to protect the display component 210. Layer 212 may be similar to the protective layer 112 of FIG. 1.

Layer 214 may be a layer that includes any suitable touch screen sensor to receive a touch input. Layer 214 may be similar to the touch screen sensor 114 of FIG. 1.

Layer 218 may be a layer that includes a display panel to display content based on a touch input. Layer 218 may be similar to the display panel 118 of FIG. 1.

Layer 216 may be a layer that is adjacent to layer 214 and layer 218 (e.g., between layer 214 and layer 218) and may include a blue light absorption layer to absorb blue light. Layer 216 may be similar to the light absorption layer 116 of FIG. 1. Layer 216 may include any suitable blue light absorption OCA and/or a blue light absorption OCR. In some examples, layer 216 may additionally include a UV absorption layer to absorb UV light using any suitable UV absorber.

Figure 3:
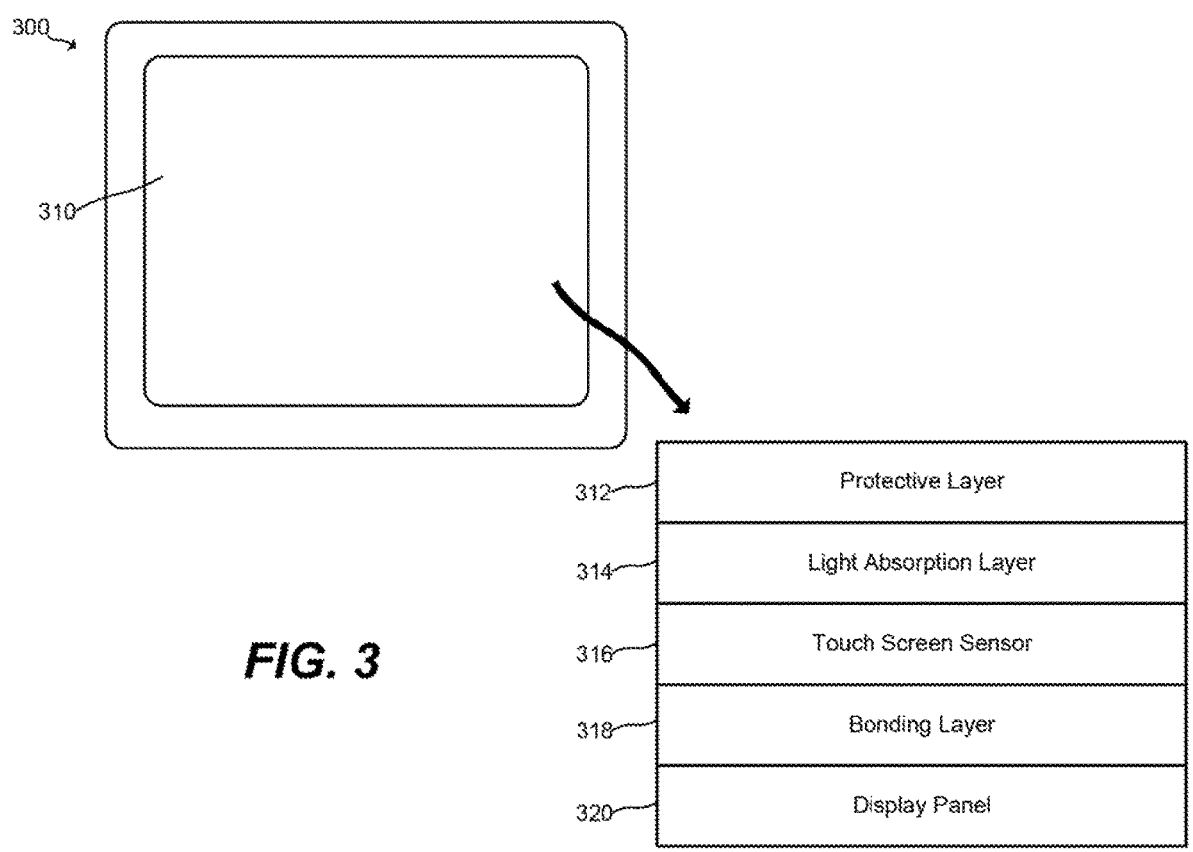
FIG. 3 is a block diagram of a touch screen display device with a light absorption layer.

FIG. 3 is a block diagram of a touch screen display device 300 with a light absorption layer 314. The display device 300 may be similar to the display device 100 of FIG. 1 and may include a display component 310, which may be similar to the display component 110 of FIG. 1.

The display component 310 may include protective layer 312, light absorption layer 314, touch screen sensor 316, bonding layer 318, and display panel 320. The protective layer 312 may be adjacent to the light absorption layer 314 and may include a cover lens or a hard coating to protect the display component 310. The protective layer 312 may be similar to the protective layer 112 of FIG. 1.

The touch screen sensor 316 may be any suitable sensor to receive a touch input. The touch screen sensor 316 may be similar to the touch screen sensor 114 of FIG. 1.

The display panel 320 may be any suitable display panel to display content based on a touch input. The display panel 320 may be similar to the display panel 118 of FIG. 1. The display panel 320 may be coupled to the touch screen sensor 316 by the bonding layer 318, which may be any suitable bonding layer (e.g., an air bonding layer, a direct bonding layer, etc.) between the display panel 320 and the touch screen sensor 316.

The light absorption layer 314 may be any suitable light absorber adjacent to the touch screen sensor 316 (e.g., between the protective layer 312 and the touch screen sensor 316). The light absorption layer 314 may be similar to the light absorption layer 116 of FIG. 1. The light absorption layer 314 may absorb blue light (e.g., via a blue light absorption OCA and/or OCR). In some examples, light absorption layer 314 may additionally include an UV absorber to absorb UV light.

What is claimed is:

1. A display device, comprising:
  a touch screen sensor to receive a touch input;
  a display panel to display content based on the touch input; and
  a light absorption layer adjacent to the touch screen sensor, the light absorption layer comprising a yellow color additive to absorb blue light, wherein the yellow color additive comprises at least one of $NiTiO_3$, lutein, lead sulfochromate yellow, lead antimonite yellow, lead-tin-antimony yellow, diarylide, arylide, bisacetoacetarylide, or benzimidazolone.

2. The display device of claim 1, wherein the light absorption layer includes at least one of a blue light absorption optical clear adhesive and a blue light absorption optical clear resin.

3. The display device of claim 1, wherein the light absorption layer is between the touch screen sensor and the display panel.

4. The display device of claim 1, further comprising:
  a protective layer adjacent to the touch screen sensor, the protective layer comprising a cover lens or a hard coating.

5. The display device of claim 1, wherein the light absorption layer is to absorb ultraviolet light.

6. A display device, comprising:
  a first layer, the first layer comprising a touch screen sensor to receive a touch input;
  a second layer, the second layer comprising a display panel to display content based on the touch input; and
  a third layer adjacent to the first layer and the second layer, the third layer comprising a blue light absorption layer comprising a yellow color additive to absorb blue light, wherein the yellow color additive comprises at least one of $NiTiO_3$, lutein, lead sulfochromate yellow, lead antimonite yellow, lead-tin-antimony yellow, diarylide, arylide, bisacetoacetarylide, or benzimidazolone.

7. The display device of claim 6, wherein the blue light absorption layer includes at least one of a blue light absorption optical clear adhesive and a blue light absorption optical clear resin.

8. The display device of claim 6, wherein the third layer is between the first layer and the second layer.

9. The display device of claim 6, further comprising:
  a fourth layer adjacent to the first layer, the fourth layer comprising a cover lens or a hard coating.

10. The display device of claim 6, wherein the third layer further comprises an ultraviolet light absorption layer to absorb ultraviolet light.

11. A display device, comprising:
  a touch screen sensor to receive a touch input;
  a display panel to display content based on the touch input, the display panel being coupled to the touch screen sensor by a bonding layer; and
  a light absorption layer adjacent to the touch screen sensor, the light absorption layer comprising a yellow color additive to absorb blue light, wherein the yellow color additive comprises at least one of $NiTiO_3$, lutein, lead sulfochromate yellow, lead antimonite yellow, lead-tin-antimony yellow, diarylide, arylide, bisacetoacetarylide, or benzimidazolone.

12. The display device of claim 11, wherein the bonding layer is an air bonding layer or a direct bonding layer between the display panel and the touch screen sensor.

13. The display device of claim 11, further comprising:
  a protective layer adjacent to the light absorption layer, the protective layer comprising a cover lens or a hard coating.

14. The display device of claim 13, wherein the light absorption layer is between the protective layer and the touch screen sensor.

15. The display device of claim 11, wherein the light absorption layer is to absorb ultraviolet light.

* * * * *